(12) United States Patent
Meythaler et al.

(10) Patent No.: US 9,763,494 B2
(45) Date of Patent: Sep. 19, 2017

(54) MATERIAL FOR SHOE UPPER

(71) Applicant: adidas AG, Herzogenaurach (DE)

(72) Inventors: Dirk Meythaler, Nuremberg (DE);
Harald Geyer, Lonnerstadt (DE);
Marco Fischhold, Tangerang (ID);
Robert Frank Kirk, Nuremberg (DE);
Jack Huang, Fujian (CN); Bruno Jean Antonelli, Annecy le vieux (FR); Ernie Rustam, Oceanside, CA (US); Dylan Moore, Encinitas, CA (US)

(73) Assignee: adidas AG, Herzogenaurach (DE)

( * ) Notice: Subject to any disclaimer, the term of this patent is extended or adjusted under 35 U.S.C. 154(b) by 740 days.

(21) Appl. No.: 14/149,802

(22) Filed: Jan. 7, 2014

(65) Prior Publication Data
US 2014/0115923 A1 May 1, 2014

Related U.S. Application Data

(63) Continuation-in-part of application No. 13/774,844, filed on Feb. 22, 2013.

(30) Foreign Application Priority Data

Feb. 24, 2012 (DE) .................. 10 2012 202 866
Feb. 13, 2013 (EP) ........................... 13155073

(51) Int. Cl.
*A43B 23/02* (2006.01)
*A43B 5/02* (2006.01)
(Continued)

(52) U.S. Cl.
CPC ............ *A43B 23/0205* (2013.01); *A43B 5/02* (2013.01); *A43B 5/025* (2013.01); *A43B 23/026* (2013.01);
(Continued)

(58) Field of Classification Search
CPC ...... A43B 23/04; B32B 27/12; B32B 2250/40
(Continued)

(56) References Cited

U.S. PATENT DOCUMENTS

| 3,397,418 A | 8/1968 | Gorman et al. |
| 4,263,356 A | 4/1981 | Nomura et al. |

(Continued)

FOREIGN PATENT DOCUMENTS

| CN | 1145759 | 3/1997 |
| CN | 1342046 | 3/2002 |

(Continued)

OTHER PUBLICATIONS

U.S. Appl. No. 13/774,844, Final Office Action mailed Mar. 3, 2016, 9 pages.
(Continued)

*Primary Examiner* — Arti Singh-Pandey
(74) *Attorney, Agent, or Firm* — Kilpatrick Townsend & Stockton LLP

(57) ABSTRACT

Described are materials for a shoe upper, in particular for soccer shoes, with a particularly low weight. The material includes an inner polyurethane layer, an outer polyurethane layer, and a textile reinforcing layer. The textile reinforcing layer is arranged between the inner polyurethane layer and the outer polyurethane layer. The inner polyurethane layer and the outer polyurethane layer comprise thermoset polyurethane. The textile reinforcing layer comprises apertures through which the inner polyurethane layer and the outer polyurethane layer are connected to each other.

22 Claims, 17 Drawing Sheets

(51) Int. Cl.
    *B29D 35/12* (2010.01)
    *B29C 39/14* (2006.01)
    *B29C 39/18* (2006.01)
    *B32B 5/02* (2006.01)
    *B32B 7/02* (2006.01)
    *B32B 27/12* (2006.01)

(52) U.S. Cl.
    CPC ...... *A43B 23/0225* (2013.01); *A43B 23/0235* (2013.01); *A43B 23/0255* (2013.01); *B29C 39/146* (2013.01); *B29C 39/18* (2013.01); *B29D 35/126* (2013.01); *B32B 5/028* (2013.01); *B32B 7/02* (2013.01); *B32B 27/12* (2013.01); *Y10T 428/24347* (2015.01); *Y10T 428/24942* (2015.01); *Y10T 442/10* (2015.04)

(58) Field of Classification Search
    USPC ......... 36/45–58; 428/98, 131, 134–140, 212, 428/213, 215, 217–220, 423.1–423.9
    See application file for complete search history.

(56) References Cited

U.S. PATENT DOCUMENTS

| | | | |
|---|---|---|---|
| 4,882,208 | A | 11/1989 | Breitscheidel et al. |
| 4,963,412 | A | 10/1990 | Kokeguchi |
| 6,171,680 | B1 | 1/2001 | Fahmy |
| 6,558,784 | B1 | 5/2003 | Norton et al. |
| 7,941,942 | B2 | 5/2011 | Hooper et al. |
| 2002/0148142 | A1 | 10/2002 | Oorei et al. |
| 2003/0093924 | A1 | 5/2003 | Delgorgue et al. |
| 2005/0054252 | A1 | 3/2005 | Baciu et al. |
| 2005/0126038 | A1 | 6/2005 | Skaja et al. |
| 2007/0199210 | A1 | 8/2007 | Vattes et al. |
| 2010/0037483 | A1 | 2/2010 | Meschter et al. |
| 2011/0088282 | A1 | 4/2011 | Dojan et al. |
| 2012/0255201 | A1 | 10/2012 | Little |
| 2013/0232815 | A1 | 9/2013 | Meythaler et al. |
| 2015/0052778 | A1 | 2/2015 | Kirk et al. |

FOREIGN PATENT DOCUMENTS

| | | |
|---|---|---|
| DE | 3919763 | 12/1989 |
| DE | 102007045739 | 4/2009 |
| DE | 102009028627 | 3/2011 |
| EP | 2649898 | 10/2013 |
| JP | 2002537878 | 11/2002 |
| JP | 2004505654 | 2/2004 |
| JP | 2010534535 | 11/2010 |
| WO | 2010110661 | 9/2010 |

OTHER PUBLICATIONS

Niles Fence & Security Products LLC., Explaining Expanded Metal Mesh, available on the internet at http://www.nilesfence.com/files/technical-information-mesh.pdf, at least as early as Feb. 26, 2015, 3 pages.

European Patent Application No. 13155073.3, "Extended European Search Report" mailed May 22, 2013, 7 pages.

FXI.Discoloration of Polyurethane Foam, http://web.archive.org/web/201 01124143851/http://fxi.com/assets/pdf/up_06_quality/Discoloration_Info_Sheet_-_111 01 O.pdf, Nov. 2010, 2 pages.

U.S. Appl. No. 13/774,844, Non-Final Office Action mailed Jul. 8, 2015, 18 pages.

Japanese Application No. 2013-033653, Office Action mailed on Jan. 17, 2017, 4 pages (No English translation available. A summary of the Office Action is provided in the Transmittal Letter submitted herewith).

German Patent Application No. 102012202866.8, Office Action dated Apr. 28, 2017, 7 pages (No English translation available. A summary of the Office Action is provided in the Transmittal Letter submitted herewith).

U.S. Appl. No. 13/774,844, Notice of Allowance dated Jul. 6, 2017, 8 pages.

MATERIAL FOR SHOE UPPER

CROSS REFERENCE TO RELATED APPLICATION

This application is a continuation-in-part of U.S. patent application Ser. No. 13/774,844, filed on Feb. 22, 2013, entitled MATERIAL FOR SHOE UPPER ("the '844 application"), which is related to and claims priority benefits from German Patent Application No. DE 10 2012 202866.8, filed on Feb. 24, 2012, entitled MATERIAL FOR SHOE UPPER ("the '866 application"), and European Patent Application No. 13155073.3, filed on Feb. 13, 2013, entitled MATERIAL FOR SHOE UPPER ("the '073 application"). The '844, '866, and '073 applications are hereby incorporated herein in their entireties by this reference.

FIELD OF THE INVENTION

The present invention relates to a material for a shoe upper, in particular for soccer shoes, with a particularly low weight.

BACKGROUND

Athletes cover great distances. In order to reduce the energy required for that, the weight, particularly also of sports shoes, is desired to be reduced. A reduced weight requires less force during accelerations, for example, and thus reduces the strain on the muscles of a player or runner.

An essential factor determining the weight of a shoe is the material of the shoe upper, which determines the weight of the sports shoe in combination with the sole. Indeed, the weight of the shoe upper may in principle be reduced by simply using less material, for example, by reducing material thicknesses. On the other hand, the shoe upper has to fulfill high quality standards, for example, with respect to abrasion resistance, flexibility, lamination, or stability. In order to fulfill these different requirements, use of multilayer or composite materials may be desirable.

Different shoe uppers with multilayer materials are known in the prior art, such as the combination of a textile material with a plastic layer. For example, DE 10 2009 028 627 A1 describes a shoe upper with textile materials, for example a nylon fabric. The textile material may be additionally enhanced on the outside and/or the inside by an appropriate coating, for example by a transparent layer made from thermoplastic polyurethane ("TPU"), which is glued onto the textile material with hot glue.

US 2010/0037483 A1 describes a material for a shoe upper in which fibers are arranged between a base layer and a cover layer for which a thermoplastic polymer material, for example TPU, may be used. Similar materials for a composite material for a shoe upper are described in U.S. Pat. No. 3,397,418, U.S. Pat. No. 6,558,784 B1, and U.S. Pat. No. 7,941,942 B2. Furthermore, US 2007/0199210 A1 describes a material in which a middle layer is arranged between a first layer and a second layer. The middle layer is a textile fabric, and the first and the second layers may be made from a foam material, for example, ethylene-vinyl acetate ("EVA") foam.

US 2011/0088282 A1 describes a composite material for a shoe upper having an outer skin layer and a substrate layer, between which a fabric layer is arranged. The substrate layer may comprise a laminate with a first material layer (e.g. leather) and a second material layer (e.g. TPU). The outer skin layer may consist of TPU or a multilayer material, for example, an outer layer from thermoset polyurethane ("PUR") or TPU, and an inner layer from TPU.

However, the use of TPU has various disadvantages. For example, TPU discolors when exposed to light (yellowing). This property impairs the quality of the material. Further, TPU is susceptible to hydrolysis. This characteristic may result in delamination of layers of material. Furthermore, a good bond of TPU with other materials usually requires an additional adhesive layer, which often results in higher weight, delamination of material layers, or impaired material quality. In general, TPU has certain mechanical material properties that may be undesirable, depending on the application. For example, TPU is stiff and inflexible due to the required adhesive layer.

In contrast, omitting the adhesive layer with TPU may also lead to problems. For example, a bond between TPU and PUR without an adhesive layer does not create a sufficient bond, since different materials are used.

It is therefore desirable to provide a composite material for a shoe upper for sports shoes to overcome at least parts of the specified disadvantages of the prior art and thus to provide a shoe that is particularly light without a loss of quality.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a material for a shoe upper comprises an inner polyurethane layer, an outer polyurethane layer, and a textile reinforcing layer. The textile reinforcing layer is arranged between the inner polyurethane layer and the outer polyurethane layer. The inner polyurethane layer and the outer polyurethane comprise thermoset polyurethane. The textile reinforcing layer comprises apertures through a plurality of which the inner polyurethane layer and the outer polyurethane layer are connected to each other. At least one of the inner polyurethane layer and the outer polyurethane layer comprises at least three polyurethane sublayers. The polyurethane sublayers comprise different properties, respectively. They can differ in terms of thickness, material properties (such as melting point), or color, for example. Three, several, or all sublayers may differ in terms of their properties.

The use of a polyurethane layer on both sides of the textile reinforcing layer provides a good bond between the two polyurethane layers, which may be further enhanced when the material is pressed under heat. Because the polyurethane layers have the same or substantially similar melting points and material properties, a better bond may be achieved between them than between a polyurethane layer and TPU.

The inner polyurethane layer and the outer polyurethane layer may connect to each other particularly well through a plurality of the apertures in the reinforcing layer when pressure and/or heat are applied, for example during a pressing process, thus reliably embedding the textile reinforcing layer arranged there between. This structure results in a material for a shoe upper that combines the elastic properties of the polyurethane layers and the durability and tensile strength of the textile reinforcing layer.

The use of thermoset polyurethane causes the inner polyurethane layer and the outer polyurethane layer to be elastic and thus particularly well suitable as a material for a shoe upper. In contrast, the use of TPU causes yellowing and results in hydrolysis (i.e., the chemical bonds are disintegrated in water). Furthermore, in contrast to TPU, no additional adhesive layer reducing elasticity is necessarily required.

The inner polyurethane layer and the outer polyurethane layer may comprise a mixture of polyester and polyether. A higher proportion of polyester results in better mechanical properties, such as increased tensile strength or increased hardness, for example. A higher proportion of polyether results in better chemical properties, such as resistance to hydrolysis and UV stability (due to aliphatic compounds in the polyether).

The textile reinforcing layer may comprise a non-thermoplastic material. Such a material has advantages for the design and the appearance of the material, since it does not melt when subject to heat and pressure. The textile structure of the reinforcing layer may therefore be maintained, even during pressing. This feature may also be advantageous to the feel of the material. As a result, different structures in the textile reinforcing layer may result in different designs and surface structures.

In some embodiments, at least one sublayer of the at least three polyurethane sublayers has a thickness of about 0.03-0.04 mm. This at least one sublayer may be a soft polyurethane layer.

According to certain embodiments, one sublayer of the at least three polyurethane sublayers has a lower melting point and is arranged closer to the textile reinforcing layer than the other sublayers of the at least three polyurethane sublayers. Such an arrangement supports melting together the inner polyurethane sublayer and the outer polyurethane sublayer through the holes of the textile reinforcing layer, since the one sublayers melt more rapidly and therefore connect to each other more rapidly/easily, whereas the other sublayers of the at least three polyurethane sublayers do not melt. Thus, the appearance of the outside of the material does not change.

According to further aspects, the invention comprises a shoe upper with the previously described material.

A still further aspect is a method of manufacture of such a material for a shoe upper in which a textile reinforcing layer is arranged between an inner polyurethane layer and an outer polyurethane layer and is pressed under heat. This stage may be carried out by means of a press, for example.

In certain embodiments, the method comprises the steps of (a) pouring a first polyurethane layer in liquid form onto a release layer (e.g. release paper), (b) applying a textile reinforcing layer comprising apertures onto the first polyurethane layer, and (c) pouring a second polyurethane layer in liquid form onto the textile reinforcing layer, such that the first polyurethane layer and the second polyurethane layer bond together through a plurality of the apertures of the textile reinforcing layer; wherein at least one of the first polyurethane layer and the second polyurethane layer comprises at least three polyurethane sublayers.

Such a method allows for easy and fast manufacturing of the material. Because the polyurethane layer is liquid when applied onto the textile reinforcing layer, it bonds with the textile reinforcing layer and runs through a plurality of the apertures of the textile reinforcing layer and bonds with the polyurethane layer on the other side of the textile reinforcing layer. Thus, the bond between both polyurethane layers and to the textile reinforcing layer becomes very strong.

The first polyurethane layer may correspond to the inner polyurethane layer mentioned above and the second polyurethane layer may correspond to the outer polyurethane layer mentioned above or vice versa.

The sublayers may be poured onto one another, such that the first polyurethane layer comprises a reverse order of sublayers compared to the second polyurethane layer. Thus, a symmetric assembly of layers results, which can be used with either orientation (i.e., the first polyurethane layer may be used as the outer polyurethane layer and the second polyurethane layer may be used as the inner polyurethane layer and vice versa).

Heat may be applied after at least one of step (a) and step (c). The liquid layers, which are in contact through a plurality of the apertures of the textile reinforcing layer, bond together when dried by applying heat. Furthermore, the polyurethane layers bond to the textile reinforcing layer by this step.

According to some embodiments, the method comprises the step of (d) pressing the first polyurethane layer, the textile reinforcing layer, and the second polyurethane layer after step (c). A final pressing step enhances the bond between both polyurethane layers and with the textile reinforcing layer even further.

The method may be a continuous process, and the release layer and the textile reinforcing layer may be supplied from respective rolls. This embodiment provides an efficient and fast production of the compound material.

In certain embodiments, a method for manufacturing a shoe upper comprises (a) arranging a toe cap, a vamp overlay, and the material of claim 1; (b) pressing the toe cap, the vamp overlay, and the material of claim 1 under heat to form an upper component; (c) welding additional components to a surface of the upper component; and (d) removing excess material from the upper component. The pressing step may be performed for approximately 60 seconds, with an upper mold temperature of about 140-150° C., with a lower mold temperature of about 50-60° C., and/or with a pressure of approximately 50-60 kg/cm². In some embodiments, the method further comprises applying hot melt film or primer between the components to increase bond strength prior to pressing. The additional components may comprise at least one of a stripe and an eyestay.

Further embodiments of the material, shoe upper, and methods according to the invention are described in the dependent claims.

BRIEF DESCRIPTION OF THE DRAWINGS

In the following detailed description, embodiments of the invention are described referring to the following figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, examples of embodiments and modifications of the present invention are described with respect to a material for a shoe upper. This material may be used for sports shoes and in particular for soccer shoes. However, it can also be used for other shoes, e.g. for basketball shoes, which require both a low weight and good mechanical properties, as described in the following.

Figure 1:
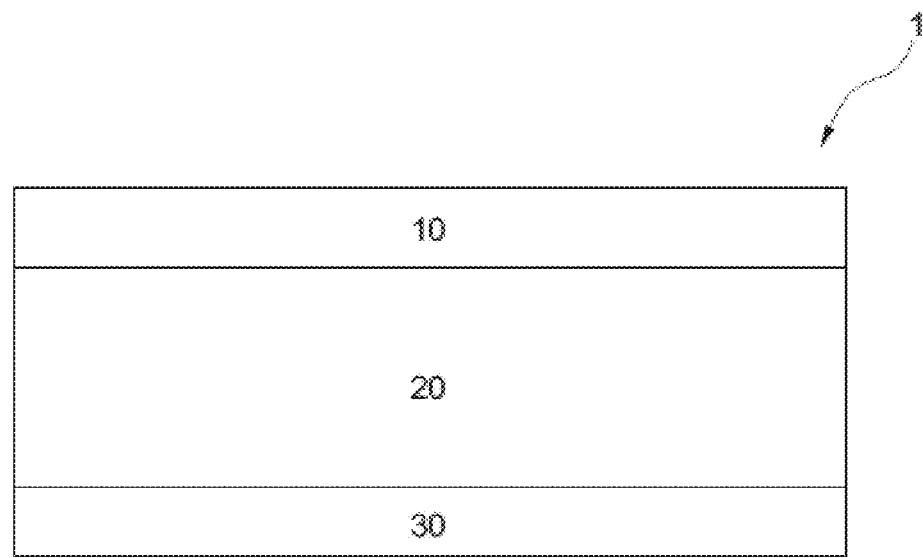
FIG. 1 is a schematic cross-sectional view of a material for a shoe upper according to certain embodiments of the present invention.

FIG. 1 illustrates an example of certain embodiments of a material 1 for a shoe upper. FIG. 1 particularly shows a schematic cross-sectional view of such a material 1. This illustration does not represent proportions, which will be discussed in more detail below. As can be recognized in FIG. 1, material 1 comprises an inner polyurethane layer 10, a textile reinforcing layer 20, and an outer polyurethane layer 30. The textile reinforcing layer 20 is arranged between the inner polyurethane layer 10 and the outer polyurethane layer 30. The polyurethane layers 10, 30 may be polyurethane films 10, 30. In other embodiments, the polyurethane layers 10, 30 may also be cast. In the following, polyurethane films 10, 30 are discussed, which will be simply referred to as PUR films 10, 30.

The term inner PUR film 10 refers to the fact that this film is arranged on the inside of a shoe upper for which the material 1 is used. The designation outer PUR 30 film refers to the fact that this film is arranged on the outside of a shoe upper for which the material 1 is used.

The inner PUR film 10, the textile reinforcing layer 20, and the outer PUR film 30 are molded together under heat and pressure. During this step, the inner PUR film 10 and the outer PUR film 30 bond together (via melting) through a plurality of the apertures in the textile reinforcing layer 20, such that a reliable connection is formed. At the same time, the inner PUR film 10 and the outer PUR film 30 enclose the threads of the textile reinforcing layer 20, thus creating a connection between the textile reinforcing layer 20 and the PUR films 10, 30. This will be discussed in more detail in the following.

In certain embodiments, the inner PUR film 10 and the outer PUR film 30 comprise a mixture of polyester and polyether. In this regard, a higher proportion of polyester results in better mechanical properties, such as increased tensile strength or increased hardness, for example. A higher proportion of polyether results in better chemical properties, such as UV stability and resistance to hydrolysis due to aliphatic compounds in the polyether.

In some embodiments, a mixture ratio of polyester to polyether of 65% to 35% is used, in order to simultaneously ensure high cost efficiency and sufficient quality, particularly UV stability and resistance to hydrolysis. However, one of ordinary skill in the relevant art will understand that any suitable mixture ratio of polyester to polyether may be used that results in the desired properties.

Due to the mixture of polyester and polyether, the PUR film is provided with its advantages, in particular over TPU. One advantage of the PUR film is its high elasticity as compared to TPU. Further, the PUR film comprises better resistance to hydrolysis than TPU.

Apart from polyether and polyester, the PUR film may also comprise polyisocyanate. In some embodiments, aliphatic polyisocyanate is used in this regard. The inclusion of polyisocyanate may prevent the PUR film from yellowing (UV stability) and also provide the PUR film with hydrolysis-resistant properties, which is a further advantage over the use of TPU.

In some embodiments, the material 1 consists of the inner PUR film 10, the textile reinforcing layer 20, and the outer PUR film 30.

The use of a PUR film on both sides of the textile reinforcing layer 20 may provide a good bond between the two films 10, 30, which is achieved during pressing of the material 1 under heat and/or pressure. In contrast, when using TPU, an additional hot-glue layer may be required in order to achieve a reliable bond of the TPU with a further TPU layer or another material. Omitting the hot-glue layer simplifies the method of manufacture for the material, and leads to a lower weight product, in accordance with certain embodiments of the invention. The use of two PUR films may also be beneficial because the PUR films have the same melting points and the same material properties, so that a better bond may be achieved between the PUR films 10, 30, rather than between a PUR film and TPU.

The bond between the PUR films 10, 30 may be strong enough to meet the physical requirements of a shoe upper, particularly for soccer shoes, in combination with a corresponding textile reinforcing layer 20 with a sufficient density of meshes. In this regard, the use of a hot-glue film may be omitted, where the hot-glue film may have a negative influence on the dynamic properties and/or the weight of the material. The materials and/or configuration of the textile reinforcing layer 20 may be specifically chosen to accommodate the properties of the PUR films 10, 30, in order to ensure a sufficient bond. Thus, the textile reinforcing layer 20 is developed specifically with regard to these requirements. The microstructure of the substrate and specifically the properties of the conditioned thread (e.g. napped thread), as well as the type of weaving technique, define the quality of the bond between the PUR films 10, 30 and the textile reinforcing layer 20. A good transparency of the material 1 and a sufficient bond require either sufficiently large apertures or many small apertures.

The textile reinforcing layer 20 alone has a tensile strength and a tear strength of at least about 30 N. The film alone has a tensile strength of at least about 6 N. The combination of the PUR films 10, 30 and the textile reinforcing layer 20 has a tensile strength of at least about 100 N.

The polyurethane used for the PUR films 10, 30 may be a thermoset polyurethane, which comprises an additional curing agent that provides the PUR film with its structural performance by heating during manufacture. In contrast, TPU may be reshaped by being heated again.

In certain embodiments, the textile reinforcing layer 20 comprises apertures that enable the inner PUR film 10 and the outer PUR film 30 to bond together (via melting) through a plurality of the apertures (i.e., the apertures reach through the entire thickness of the textile reinforcing layer 20).

The material of the textile reinforcing layer may be a non-thermoplastic material so that only the inner PUR film 10 and the outer PUR film 30 are melted together. The material of the textile reinforcing layer 20 may alternatively also consist of a thermoplastic material (e.g. polyamide/nylon), so that this material also merges with the PUR films. For design purposes and the outer appearance of the material 1, a non-thermoplastic material may be used. Melting together of the films may result in different color effects. PUR films 10, 30 may also be printed.

Depending on the thickness of the textile reinforcing layer 20, its structure may be felt through the PUR film and may also be visible, if transparent PUR films are used. In this way, different surface structures having different properties, e.g. friction coefficients, may be manufactured. Furthermore, visual effects may be achieved by the use of different materials for the textile reinforcing layer 20 and different colors for the PUR films 10, 30.

Figure 2:
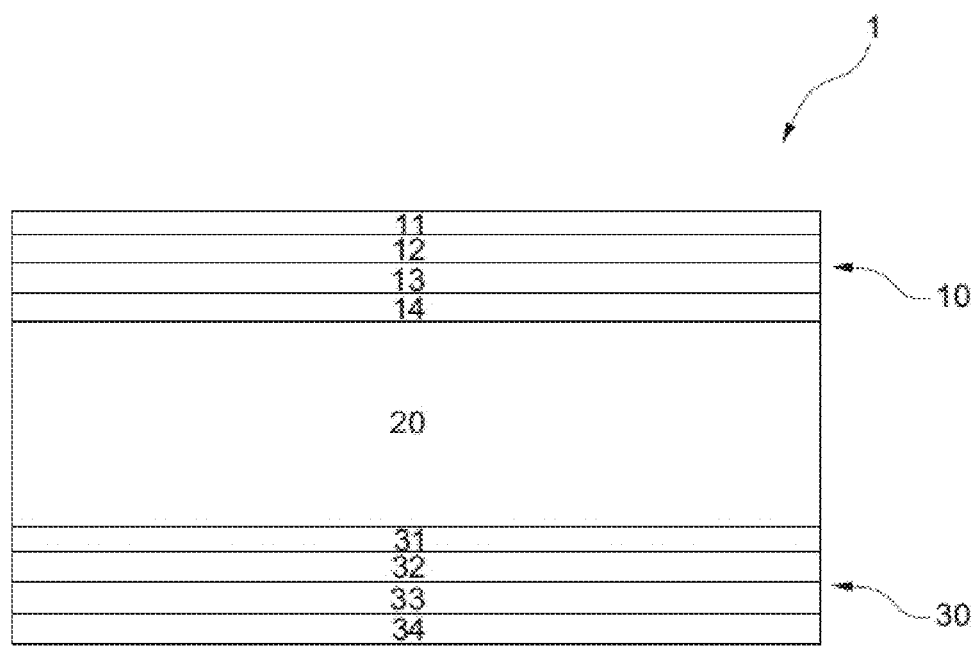
FIG. 2 is a schematic cross-sectional view of a material for a shoe upper according to certain embodiments of the present invention.

FIG. 2 illustrates certain embodiments of the material 1 for a shoe upper, in which the inner PUR film 10 comprises four film layers 11-14 and the outer PUR film 30 comprises four film layers 31-34. Each of these layers may have a thickness of about 0.02 mm, so that the inner PUR film 10 and the outer PUR film 30 each have a thickness of about 0.08 mm. In other embodiments, these sizes may vary. In particular, the individual film layers 11-14 and 31-34 may have different thicknesses. The film layers are also referred to as sublayers. The use of film layers may provide a substantially uniform film thickness, among other things.

Figure 6:
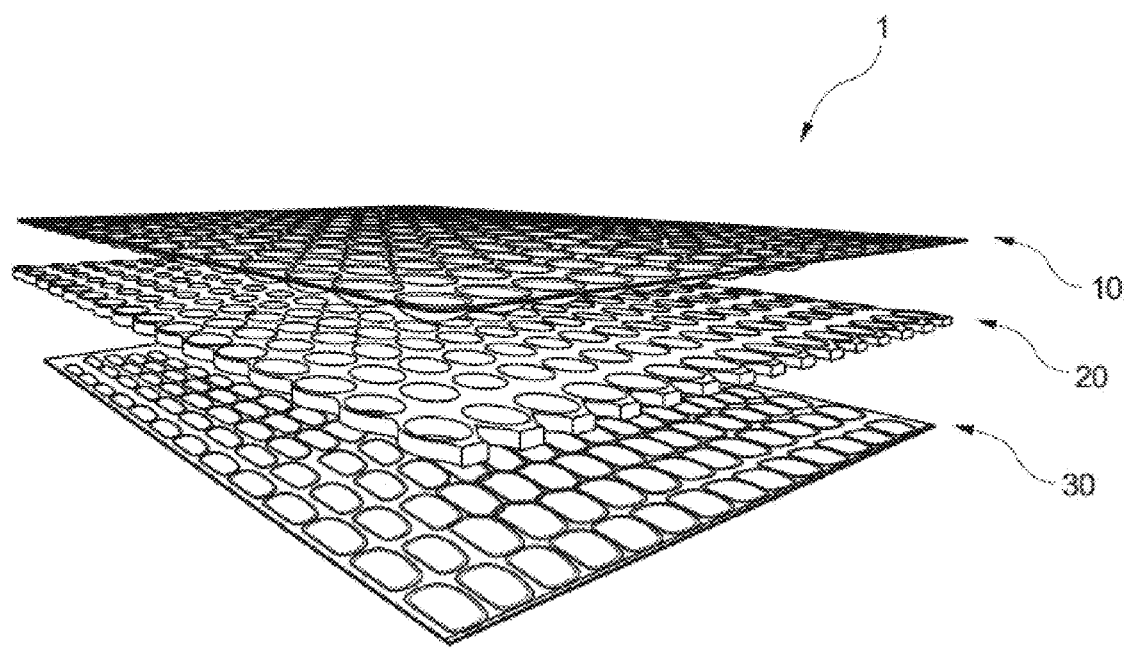
FIG. 6 is a schematic view of a material for a shoe upper according to certain embodiments of the present invention.

Thus, the use of four film layers, each with a thickness of about 0.02 mm, results in a substantially uniform layer thickness of about 0.08 mm. In further embodiments, as shown in FIG. 6, the film layers may have a thickness ranging from about 0.10-0.16 mm.

Figure 3:
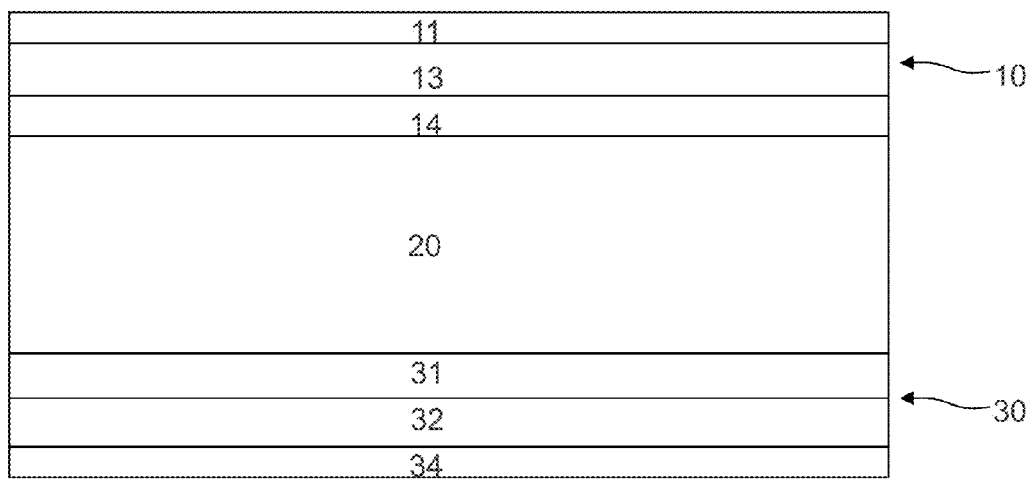
FIG. 3 is a schematic cross-sectional view of a material for a shoe upper according to certain embodiments of the present invention.
Figure 4:
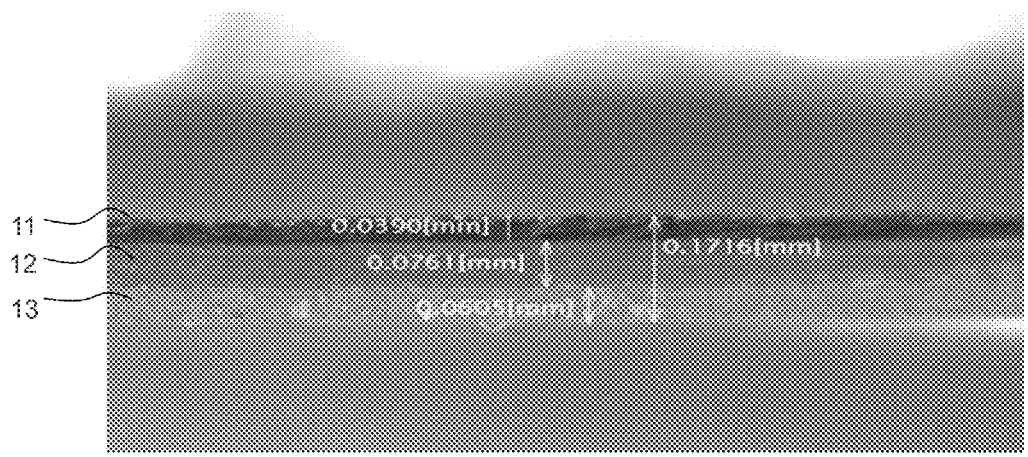
FIG. 4 is a cross-sectional image of a material for a shoe upper according to FIG. 3.
Figure 9:
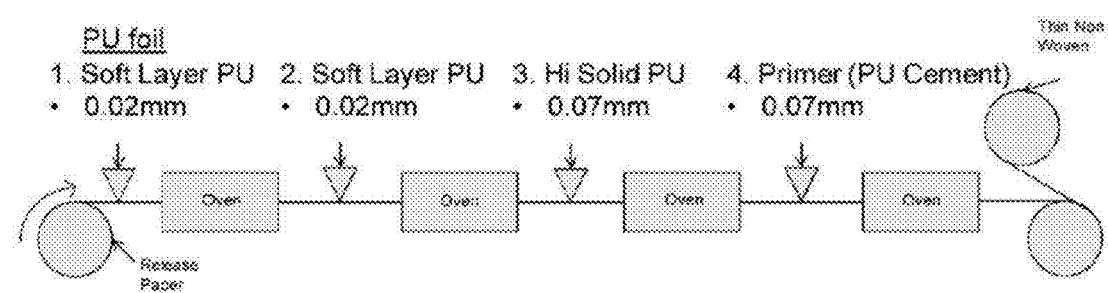
FIG. 9 is a diagram illustrating a production method of a polyurethane layer as used with certain embodiments of the present invention.

FIGS. 3-4 illustrate certain embodiments of the material 1 for a shoe upper, in which the inner PUR film 10 comprises three film layers 11, 13, 14 and the outer PUR film 30 comprises three film layers 31, 32, 34. In these embodiments, the individual soft PUR layers 11, 12 and 33, 34 (in the embodiments shown in FIG. 2) have been combined into a single soft PUR layer 11, 34. The soft PUR layer 11, 34 may be formed through a single thicker application of soft PUR layer coating or through two thinner applications of soft PUR layer coating as illustrated in FIG. 9 (similar to the two thinner layers 11, 12 and 33, 34 in the embodiments shown in FIG. 2), the specifics of which are described in more detail below. Thus, film layers 11 and 34 may have a thickness of about 0.03-0.04 mm. Film layers 13, 32 may have a thickness of about 0.07-0.08 mm. Film layers 14, 31 may have a thickness of about 0.05-0.06 mm. In other embodiments, the three film layers, each with a thickness of about 0.025-0.03, results in a substantially uniform layer thickness of about 0.08 mm. In further embodiments, as shown in FIG. 6, the film layers may have a thickness ranging from about 0.10-0.16 mm. Film layer 14 of the inner PUR film 10 and the film layer 31 of the outer PUR film 30, the primer PUR layers, both of which face the textile reinforcing layer 20, may have a lower melting point than the outer layers 11, 12, 13 and 32, 33, 34 (as shown in FIG. 2) and the outer layers 11, 13 and 33, 34 (as shown in FIGS. 3-4). Film layers 14, 31 play a key factor in achieving good lamination between each PUR film 10, 30 and the textile reinforcing layer 20, and with the opposing PUR film 10, located on the other side of the textile reinforcing layer 20. During pressing of material 1, the inner PUR film 10 and the outer PUR film 30 may therefore be melted together under heat without a separate bonding layer being required and without the outer PUR film layers melting and their appearance on the surface being altered. The inner film layers melt more rapidly, thus facilitating melting without changing the outer film layers. Film layers 14 and 31, for example, may have a melting point of about 100-150° C., and may further have a melting point of about 130° C. The outer film layers 11, 12, 13 and 32, 33, 34 (as shown in FIG. 2) and the outer layers 11, 13 and 33, 34 (as shown in FIGS. 3-4) may have a melting point of about 150-200° C., and may further have a melting point of about 160° C.

In further embodiments, film layers 13 and 32, the high solids PUR layers, which are adjacent to the above-mentioned film layers 14 and 31, respectively, also have a lower melting point than the other film layers 11, 12 and 33, 34 (as shown in FIG. 2) and the outer layers 11 and 34 (as shown in FIGS. 3-4). The high solids PUR layers 13, 32 influence the impact of the PUR films 10, 30 on abrasion and flex performance.

Layers 11, 12 and 33, 34 (as shown in FIG. 2) and the outer layers 11 and 34 (as shown in FIGS. 3-4), the soft PUR layers, are the external layers. The soft PUR layers 11, 34 provide the effect and embossed look for the outer surface of the PUR films 10, 30.

In further embodiments, the number of layers and their thicknesses may vary. In particular, the inner PUR film 10 and the outer PUR film 30 may have different numbers of layers and have different properties. The inner PUR film 10 and the outer PUR film 30 may therefore be adjusted to their functions as inner and outer surfaces of a shoe upper, respectively. For example, the outer PUR film 30 (or only the outermost film layer) might be designed for high abrasion, which may be important for a soccer shoe.

In theory, the polyurethane sublayers of the inner PUR film 10 and the outer PUR film 30 may have different properties. The properties may differ in terms of thickness (as described above), material properties (such as melting point), or color, as examples. Two, several, or all sublayers may differ in terms of their properties.

A further aspect of embodiments of the invention relates to a shoe upper with the previously described material and a shoe with such a shoe upper.

As described above, different surface structures may be generated by the use of different materials for the textile reinforcing layer 20, since the surface of the outer PUR film 30 adapts to the surface of the textile reinforcing layer 20 arranged below and therefore leads to a textured surface. Thus, due to different textile reinforcing layers, it is possible to create zones with different surface textures, which fulfill different functions, in a shoe upper. For example, a soccer shoe may comprise zones which have different frictions or adhesions when in contact with a ball. Thus, for example, zones of a soccer shoe which are often used for dribbling, may be provided with increased friction on the surfaces of those zones by selecting a corresponding surface structure, so as to ensure good control of the ball.

Figure 5:
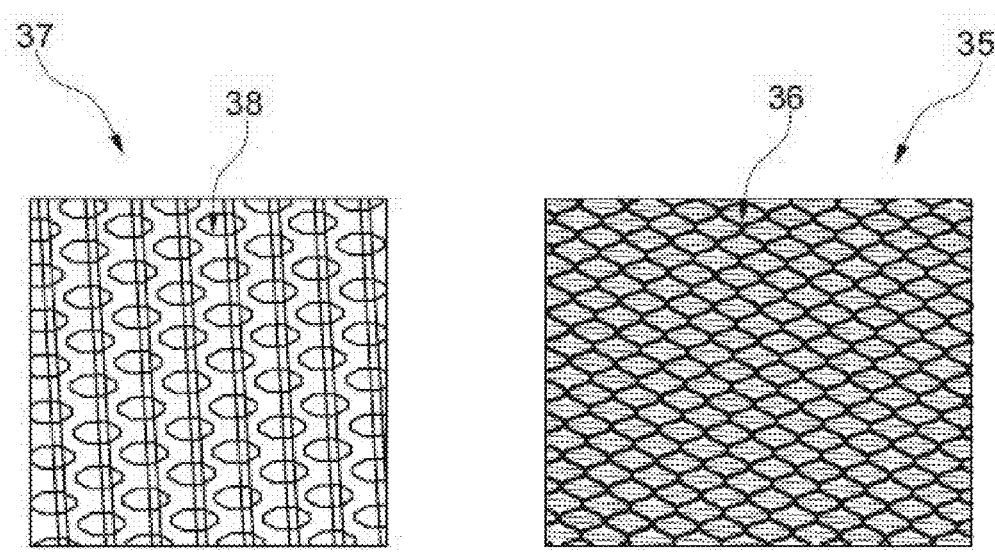
FIG. 5 illustrates materials for a textile reinforcing layer according to certain embodiments of the present invention.

FIG. 5 shows two examples of textile reinforcing layers 35, 37. The size of apertures 36, 38 in the textile reinforcing layers 35, 37 may be in the range of about 0.25 mm$^2$ to about 9 mm$^2$. In this range of sizes, there is still good bonding between the inner PUR film 10 and the outer PUR film 30 without the size of the holes obstructing the mechanical properties of the textile reinforcing layer 20. In some embodiments, as shown in FIG. 6, the diameter of the apertures is in the range from about 0.1-0.2 mm.

In this regard, the apertures may have a range of geometries from circular to diamond-shaped. The meshes, threads, or fibers of the textile reinforcing layer 20 may be reinforced by horizontal or vertical threads in order to reinforce shape of the geometries and ensure a better bond.

In some embodiments, a flat textile reinforcing layer is used, because no three-dimensional structure is desired (i.e., the surface is to be as smooth as possible and the film is not intended to melt into the textile reinforcing layer). In principle, both smooth and structured surfaces are possible.

Although the resulting material 1 for a shoe upper has a very low weight, this material passes quality tests with respect to at least abrasion resistance, flexibility, delamination, UV stability, resistance to hydrolysis, and mechanical stability (such as tensile strength, tear strength, seam resistance).

FIG. 6 shows an example of certain embodiments of a material 1 for a shoe upper in an exploded diagram. Material 1 comprises an inner polyurethane film 10, a textile reinforcing layer 20, and an outer polyurethane film 30. The two films 10, 30 consist of film layers with a thickness ranging from about 0.10-0.16 mm. The textile reinforcing layer 20 comprises a polyether thread and has openings with diameters ranging from 0.1-0.2 mm. In certain embodiments, the textile reinforcing layer 20 has a flat structure (two-dimensional mesh).

Material 1, as shown in FIG. 6, has a weight of approximately 27-28 g (A4 format), which corresponds to a weight of approximately 450-470 g/m$^2$.

The weight of the textile reinforcing layer 20 amounts to approximately 8-12 g (A4 format), which corresponds to a weight of approximately 130-200 g/m$^2$. Accordingly, the weight of the inner polyurethane film 10 and of the outer polyurethane film 30 each ranges from approximately 135-160 g/m$^2$, respectively. In some embodiments, such as the examples shown in FIGS. 3-4, each PUR film 10, 30 has a hardness of 6.0 (BLCST300) and a density of 0.9 g/cm$^3$.

Figure 7:
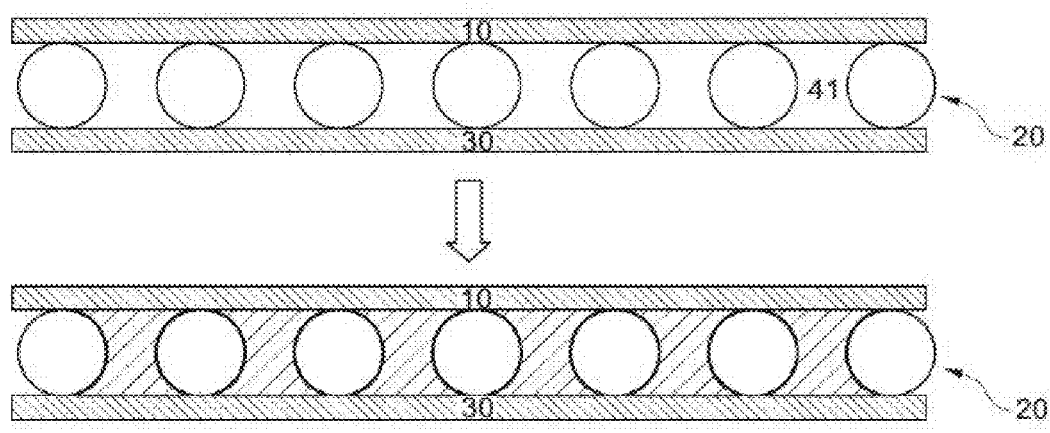
FIG. 7 is an illustration of the manufacture of a material according to certain embodiments of the present invention.

According to certain embodiments, FIG. 7 illustrates the manufacturing process for a material 1 described above, by showing a schematic cross-sectional view of the material before and after manufacture. The material before manufacture is depicted in the upper area of FIG. 7 and the material after manufacture is depicted in the lower area of FIG. 7. The textile reinforcing layer 20 is indicated by circles, which may, for example, represent a cross-section through fibers of the textile reinforcing layer 20, and by the apertures 41 arranged there between. By applying heat and/or pressure—indicated by the arrow in the center of FIG. 7—the inner PUR film 10 and the outer PUR film 30 may melt together to form liquid material filling the apertures 41. The corresponding illustrations in FIG. 7 are purely schematic and do not represent proportions.

A PUR film 10, 30 with several layers, as illustrated in FIGS. 2 and 3-4, is manufactured on a substrate. The layers are subsequently applied onto the substrate in a liquid state. All combined layers may then be cured in an oven, which leads to a PUR film as described above.

In certain embodiments, the film layers may also be directly attached to the textile reinforcing layer 20.

Figure 8:
FIG. 8 is a perspective view of a soccer shoe with a material according to certain embodiments of the present invention.

FIG. 8 shows a soccer shoe 2 in which the material 1 described above is used. An area (ribbon) 50 reinforced with aramid yarns (e.g. Kevlar®) for stabilizing lateral movements is arranged in the lateral mid-foot area of the soccer shoe. Area 50 supports the foot in movements in which the foot is bent inwards. For example, area 50 supports the foot when the foot lands on the ground if the leg is angled towards the inside of the foot. This prevents the danger of "twisting" the ankle.

Material 1 described above is thin, which may be desirable in view of the low weight requirements for a sports shoe, but also may have minimal cushioning properties. In certain embodiments, it may be desirable to increase the cushioning of material 1 for certain requirements. It is therefore conceivable to introduce a cushioning or padding layer on the inside of the material 1 and/or between the PUR films 10, 30. This layer may be a PU foam, for example, which is sprayed between the layers extensively or only in certain places. In order to add the cushioning layer, the PUR films 10, 30 might be melted/welded only in certain locations. The unconnected cavities may then be filled with compressed air, PU foam, or other cushioning materials.

A three-dimensional structured textile reinforcing layer (three-dimensional mesh or spacer mesh) may also be used to provide the desired cushioning. Such a textile reinforcing layer may also comprise areas with different thicknesses. In a first area where cushioning is desired and where the PUR films are not connected to each other, the textile reinforcing layer may be designed with a correspondingly greater thickness. In a second area where no cushioning is desired and where the PUR films are connected to each other, the textile reinforcing layer may be designed in a correspondingly thin manner, as described above.

According to certain embodiments, FIG. 9 illustrates a method for manufacturing a polyurethane layer having multiple polyurethane sublayers and being used in the aforementioned material for a shoe upper. In these embodiments, a stirred formulation is melted and released into a container. The container may constantly be mixed by a continually moving device. The formulation may be dispersed from the bottom of the container evenly through a small gap of specified thickness. A continuously moving release paper passes below the container, thus dragging the mixture onto the release paper in a substantially uniform layer. The release paper may be embossed with a desired pattern and depth particular to design and/or function. The applied thickness of this first layer may also be monitored with a laser device, which scans from one side to the other, ensuring that thickness is applied consistently and evenly. For example, this first layer, which is a soft PUR layer, may have a thickness of about 0.02 mm. In some embodiments, as illustrated in FIGS. 3-4, this first soft PUR layer may have a thickness of about 0.04 mm. Following this stage, the release paper may move through a heated oven at a relatively constant speed until the desired amount of drying and evaporation has occurred.

In some embodiments, the process may then be repeated by applying a second layer of soft layer PUR on top of the first layer. This layer may also have a thickness of about 0.02 mm for example. In the embodiments where the first layer was applied at a thickness of about 0.04 mm, the second layer of soft PUR may be eliminated. In other embodiments, the first and second applications of the soft PUR layer are combined to form single thicker layers 11, 34 in the embodiments of PUR films 10, 30 illustrated in FIGS. 3-4.

A layer of high solids PUR may then be applied to the layer(s) of soft PU, wherein the high solids PUR layer may have a thickness of about 0.07 mm for example. A second differing formulation may be included in this high solids PUR application. The above described process of applying the PUR layers may be repeated with the high solids PUR layer. The high solids PUR layer may be a thicker layer, which may be set and/or controlled according to the precision of the thicknesses of the first (and/or second) layer(s). Therefore, this high solids PUR layer may need more time in an oven and/or a higher temperature must be used. When the high solids PUR layer is changed, a color and/or formula change may also be applied to both soft and hard PUR layers, depending on the features required.

The final application may apply a primer PUR layer whose function is to primarily assist with the bonding of the PUR layers to the textile reinforcing layer and the PUR layer located on the other side of the textile reinforcing layer 20. The PUR layers and release paper may be kept tight by moving through various roller combinations. Following the final oven stage, a very thin and light non-woven material sheet may be placed on top of the PUR surface for protection prior to rolling up for storage.

The final rolled up PUR film may be moved to a storage device where it is left to cure and stabilize, for example for 24 hours, before it is ready for use in shoe production.

Figure 10:
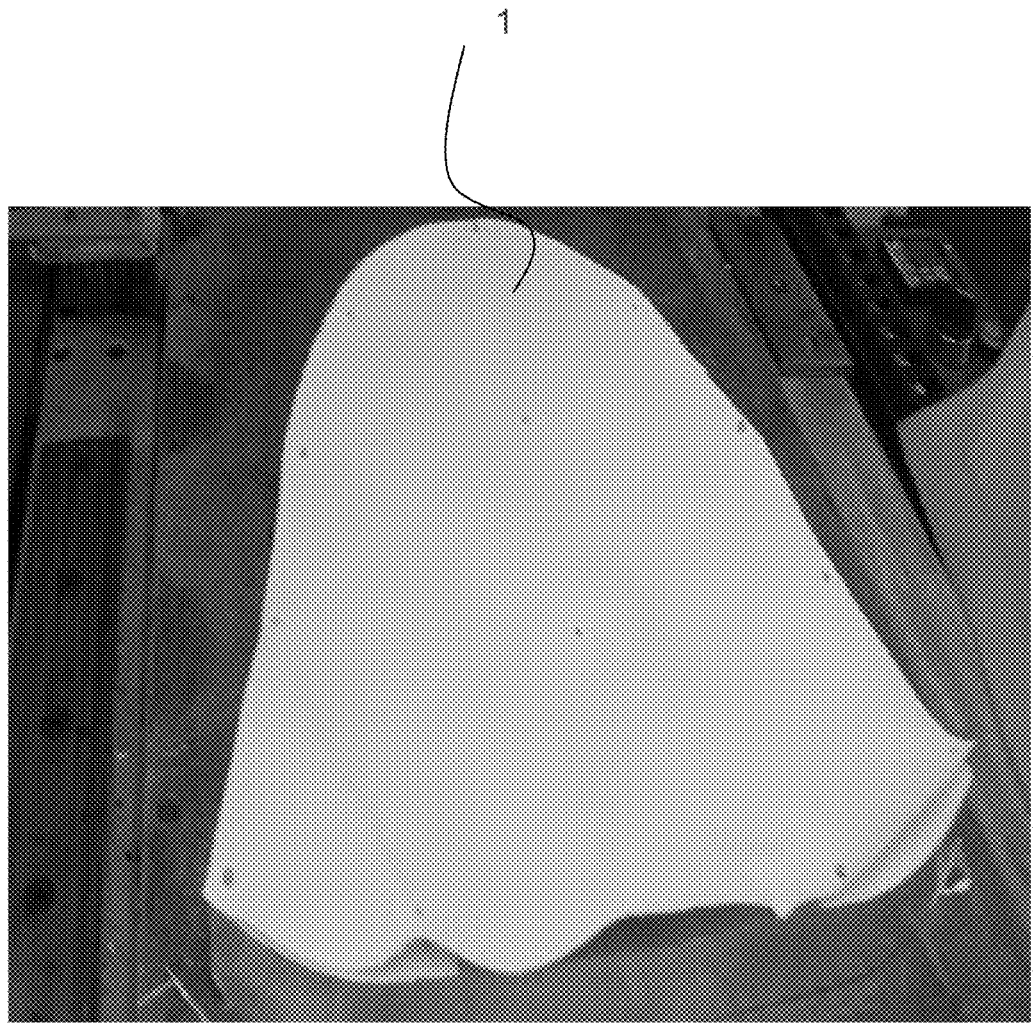
FIG. 10 is an image of a molded composite material for a shoe upper according to certain embodiments of the present invention.
Figure 14:
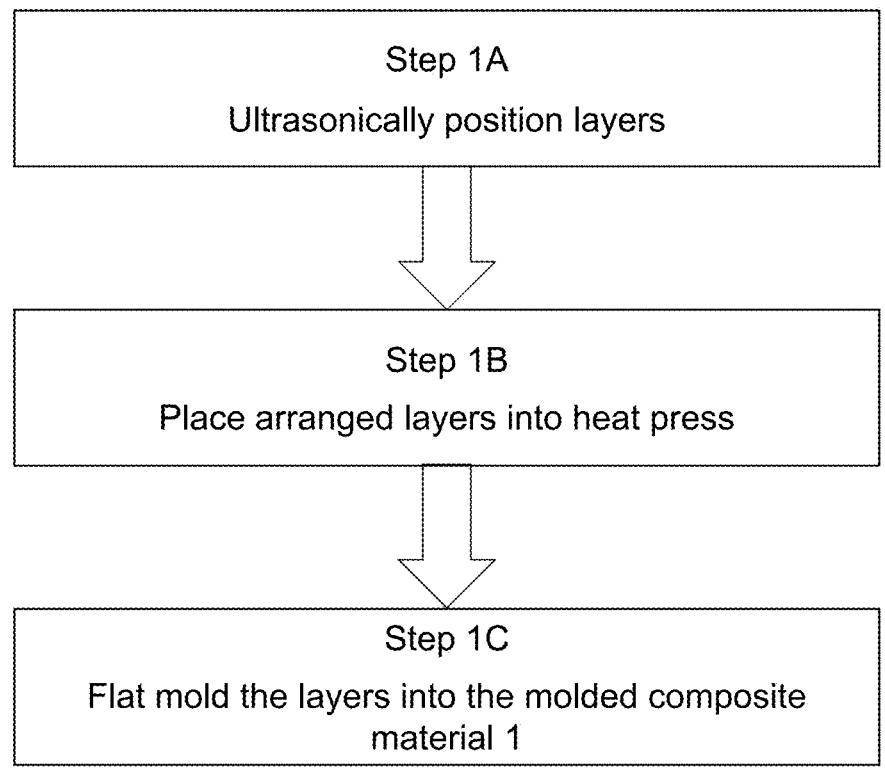
FIG. 14 is a diagram illustrating a process of preparing the molded composite material of FIG. 10 according to certain embodiments of the present invention.

According to certain embodiments, the polyurethane layer produced as described above may then be used to produce a material for a shoe upper according to the invention as follows:

FIG. 14 illustrates the process of preparing a molded composite material 1. The PUR films 10, 30 and a mesh material being used as the textile reinforcing layer 20 with apertures are die cut. As shown in Step 1A, the mesh material 20 is arranged between the inner PUR layer 10 and the outer PUR layer 30 using ultrasonic positioning. In Steps 1B-1C, the material may be assembled on a silicon pad or mold and pressed under a heat press. The material may be flipped around and rotated by approximately 90°. Thus, if the orientation was "landscape" before, it now is "portrait" and vice versa. The material may then be heat pressed a second time. The end product is the molded composite material 1, as shown in FIG. 10.

By the above-described process, both polyurethane layers melt together through a plurality of the apertures of the mesh material. The first polyurethane layer may for example be the inner polyurethane layer as described above and the second polyurethane layer may be the outer polyurethane layer as described above. The situation may as well be reversed.

During pressing in Step 1C, the machine temperature may approximately be about 140° on both sides of the press. In other embodiments, the upper mold is about 130-140° C., and may be about 110-160° C. In other embodiments, the bottom mold is about 70-80° C., and may be about 50-100° C.

Figure 11:
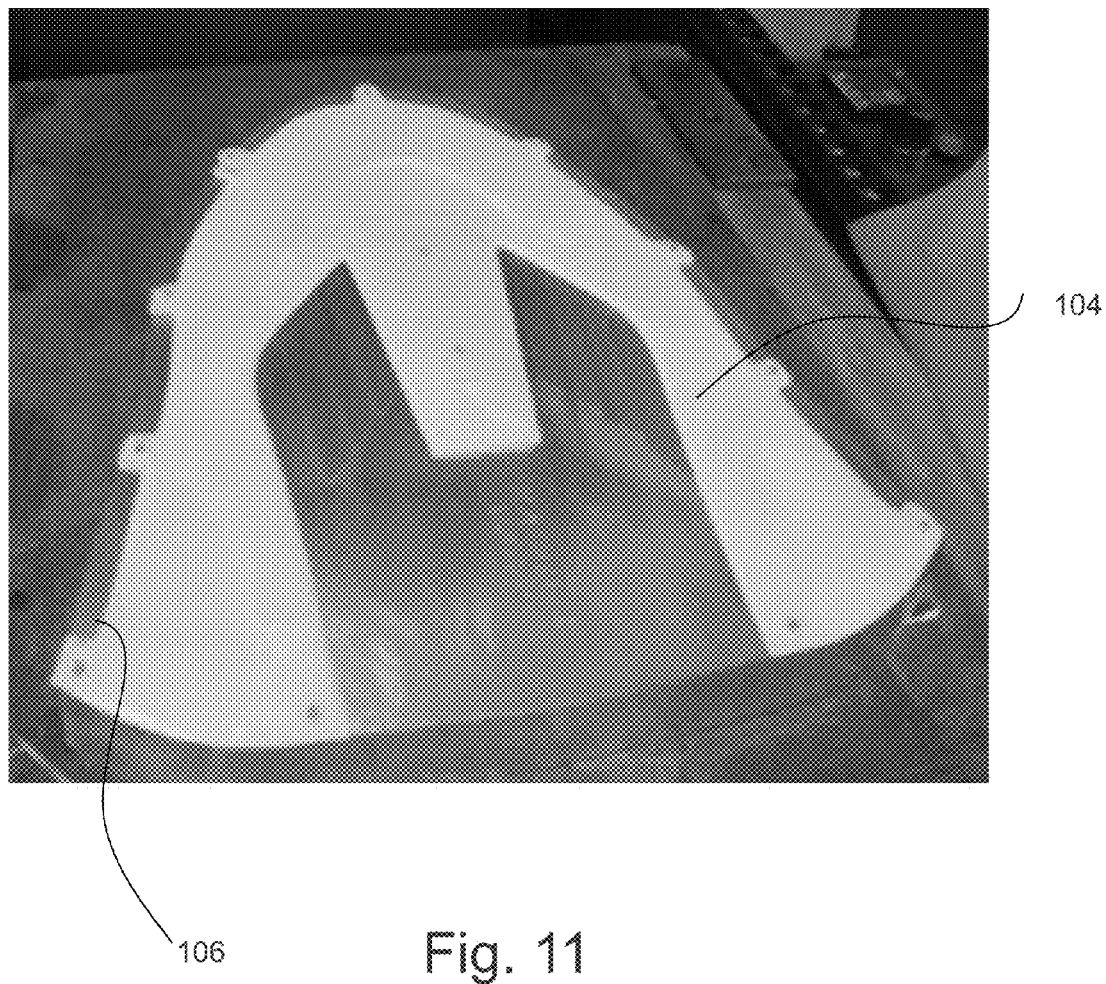
FIG. 11 is an image of certain components that are combined with the composite material of FIG. 10 to form a finished upper component according to certain embodiments of the present invention.
Figure 12:
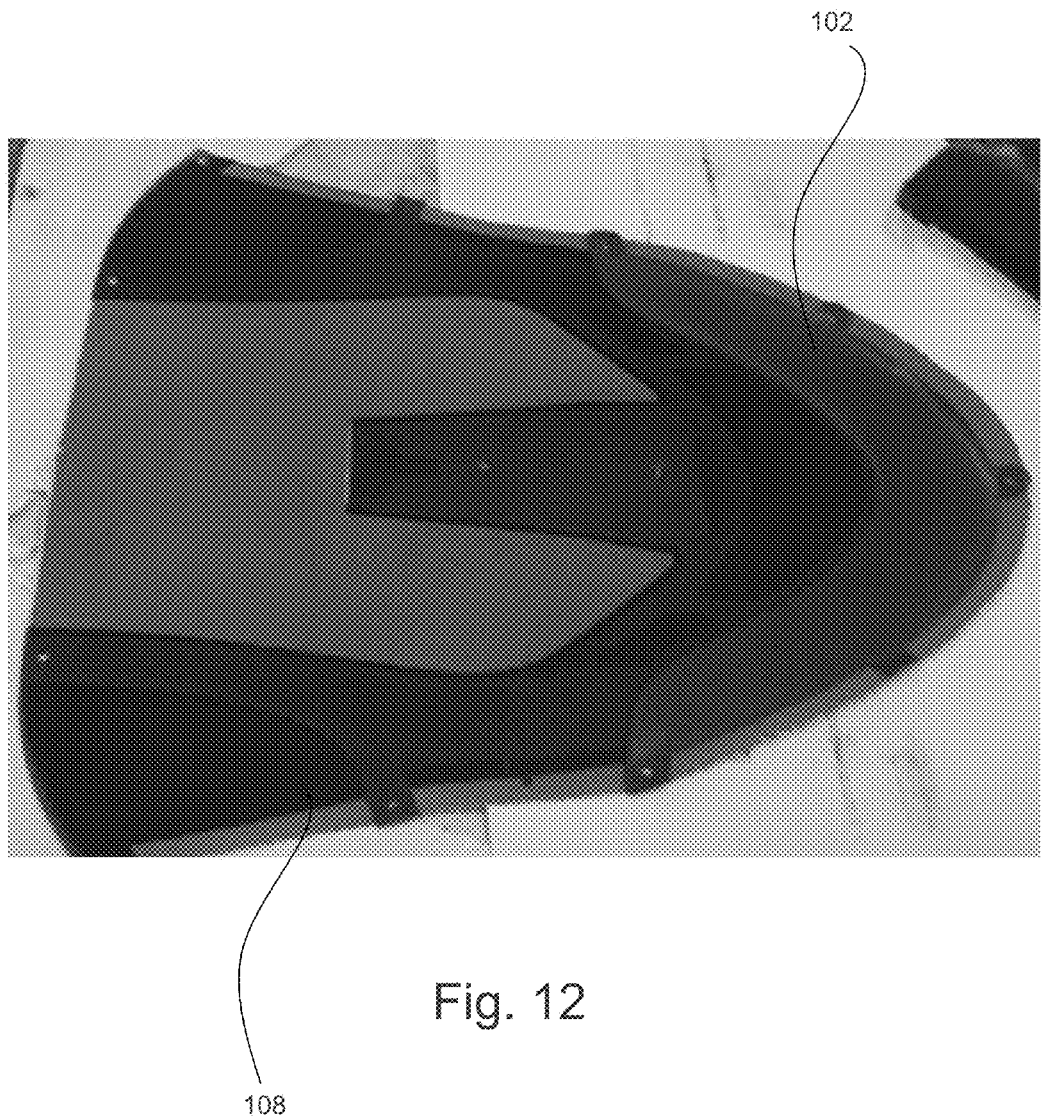
FIG. 12 is an image of a finished upper component according to certain embodiments of the present invention.
Figure 15:
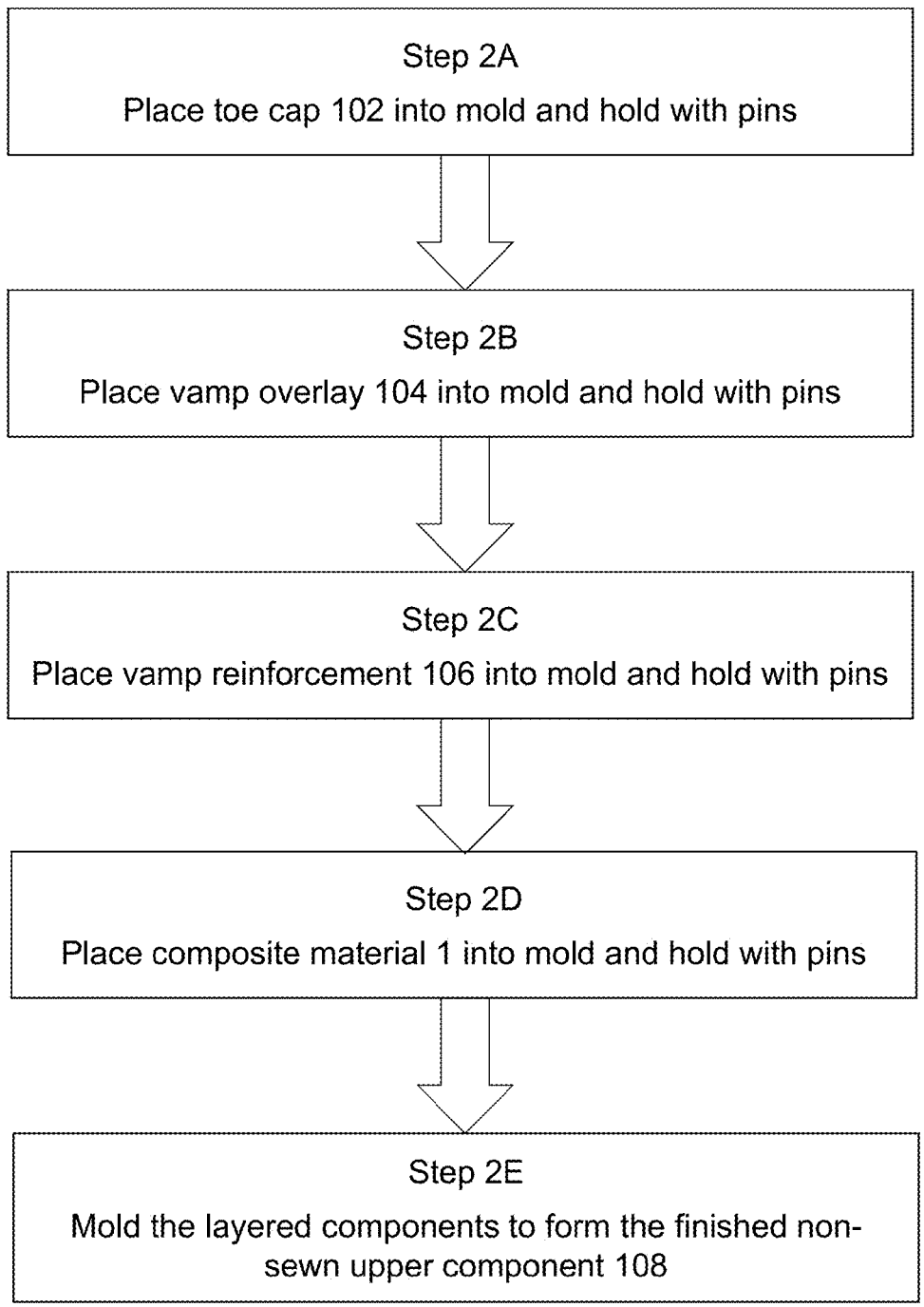
FIG. 15 is a diagram illustrating a process of preparing the finished upper component of FIG. 11 according to certain embodiments of the present invention.

The assembly may be pressed for approximately 30-60 seconds, and more particularly, may be pressed for approximately 30 seconds. In some embodiments, the pressure may be approximately 50 kg/cm$^2$, or may be approximately 100 kg/cm$^2$ FIG. 15 illustrates the process of preparing a finished non-sewn upper component 108 from the molded composite material 1. In Step 2A, a toe cap 102 is placed into the mold and held in place by pins. In Step 2B, a vamp overlay 104 is added into the mold over the toe cap 102 and also held in place by pins. In Step 2C, a vamp reinforcement 106 is then placed into the mold over the vamp overlay 104 and also held in place by pins. The layered vamp overlay 104 and vamp reinforcement 106 are shown in FIG. 11. In Step 2D, the composite material 1 is placed into the mold over the vamp reinforcement 106 and also held in place by pins. In Step 2E, the layered materials are then placed in the heat press. During pressing, the upper mold is about 140-150° C., and may be about 120-170° C. During pressing, the bottom mold is about 70-80° C., and may be about 50-100° C. The assembly may be pressed for approximately 60 seconds. The pressure may be approximately 50-60 kg/cm$^2$. In some embodiments, the bonding layers between the materials need hot melt film or primer/cement to increase the bond strength. Finally, as shown in FIG. 12, the output is a finished non-sewn upper component 108.

Figure 16:
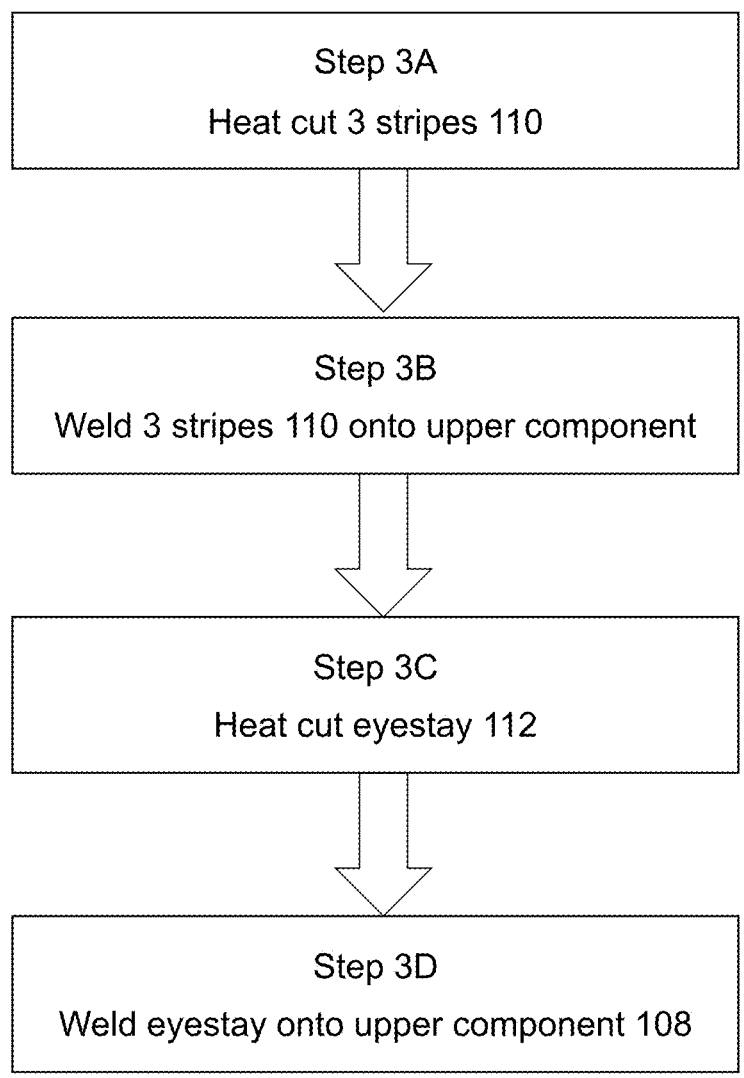
FIG. 16 is a diagram illustrating a process of adding stripes and eyestays to the finished upper component of FIG. 12 to form the upper piece of FIG. 13 according to certain embodiments of the present invention.

FIG. 16 illustrates the process of adding stripes 110 and eyestays 112 through TPU welding to the upper component 108. As shown in Steps 3A-3B, three stripes 110 are heat cut from TPU and welded onto the upper component 108. Then, in Steps 3C-3D, eyestays 112 are also heat cut from TPU and welded onto the upper component 108.

Figure 13:
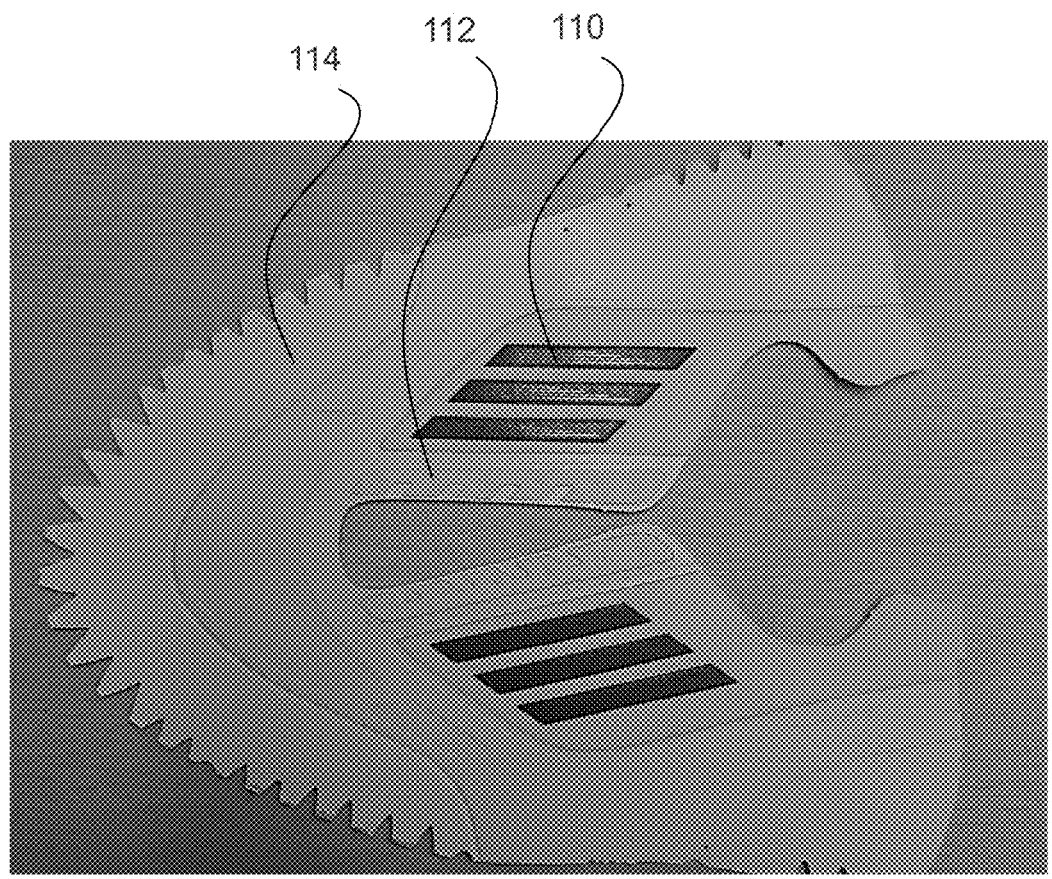
FIG. 13 is an image of an upper piece formed from an upper component according to certain embodiments of the present invention.

FIG. 13 illustrates a molded upper piece 114 formed by inner cutting the upper component 108 to remove the excess material.

Figure 17:
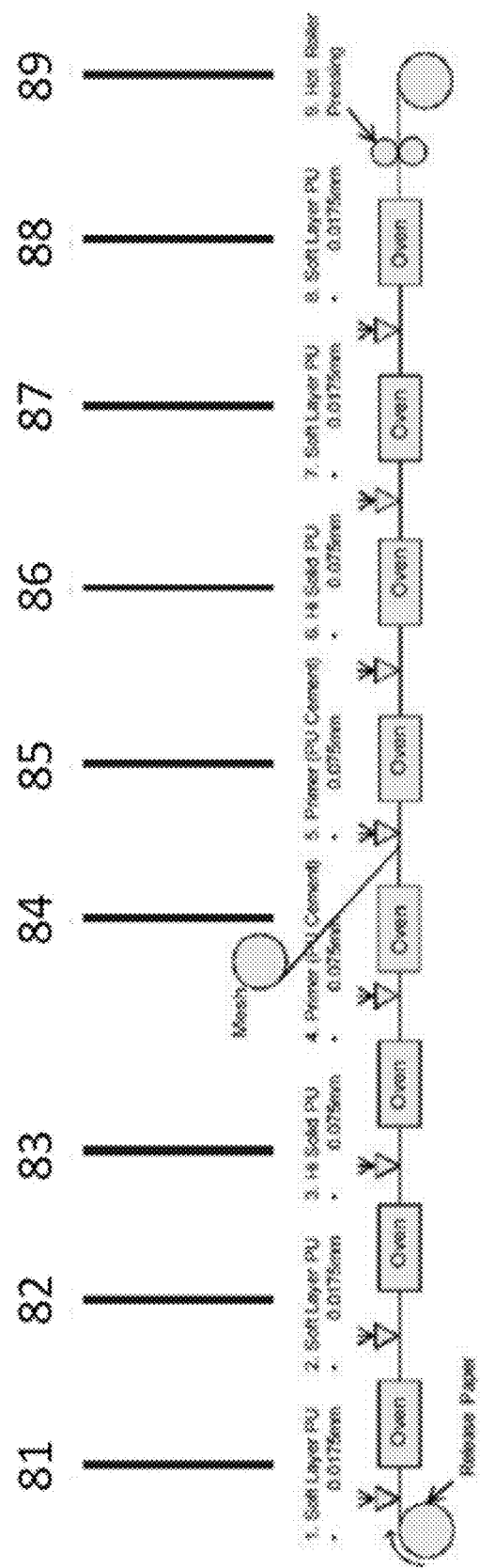
FIG. 17 is a diagram illustrating a production method of a material for a shoe upper according to certain embodiments of the present invention.

According to other embodiments, FIG. 17 illustrates an alternative method for producing the material 1 based on a liquid PUR method.

Steps 81 to 84 use the same production techniques as described above with respect to FIG. 9, with the exception of variable oven times. In these embodiments, the oven time may be varied to ensure that the layer is not fully dry before applying a mesh. Thus, liquid polyurethane is poured directly onto a release paper. The liquid polyurethane may be applied in four sublayers. The first and second of these sublayers may have a thickness of approximately 0.0175 mm, while the third and fourth sublayers may have a thickness of approximately 0.075 mm.

Between steps 84 and 85, a textile reinforcing layer (e.g. mesh) is directly included in the process on top of the semi dry PUR layer. A light pressing step may also be included at this stage. The mesh may be the textile reinforcing layer having apertures as mentioned in this description.

In steps 85 to 88, the reverse order of sublayers is then applied using similar methods of inter-layer oven heating. At this stage, the material is almost fully dry. However, the sublayers on both sides next to the mesh may still be semi-liquid and, therefore, can bond through a plurality of the apertures of the mesh even without heat-pressing. Heat-pressing, such as in step 89, may further enhance the bond.

At step 89, a final hot roller at high pressure ensures full bonding of layer to layer and layer to mesh. The inner sublayers bond together through a plurality of the apertures in the mesh. At this stage, an embossment may be added through the roller on both sides (if the release paper is removed) or by release paper on one side. Because of the opportunity for molecular bonding here, there is a potential for a removal and/or replacement of the inner (sub)layers which are also called the primer (sub)layers.

Both methods being described with reference to FIGS. 9 and 17 include the potential to vary (sub)layer formula, color combination, and thickness according to the features and specifications that are required on the shoe, requiring small changes in oven time or temperature. The number of sublayers is also changeable using the same production techniques. For example, a single sublayer, two sublayers, three sublayers or even more than four sublayers may be used. In addition, it is possible to vary the mesh type.

The present invention relates to a material for a shoe upper, in particular for soccer shoes, with a particularly low weight.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. Material for a shoe upper, in particular for soccer shoes, comprising:
   (a) an inner polyurethane layer;
   (b) an outer polyurethane layer; and
   (c) a textile reinforcing layer comprising apertures, which is arranged between the inner polyurethane layer and the outer polyurethane layer,
   wherein the inner polyurethane layer and the outer polyurethane layer comprise thermoset polyurethane and are connected to each other through a plurality of the apertures of the textile reinforcing layer and,
   wherein at least one of the inner polyurethane layer and the outer polyurethane layer comprises at least three polyurethane sublayers.

2. The material for a shoe upper of claim 1, wherein the textile reinforcing layer comprises a non-thermoplastic material.

3. The material for a shoe upper of claim 1, wherein at least one sublayer of the at least three polyurethane sublayers has a thickness of about 0.03-0.04 mm.

4. The material for a shoe upper of claim 3, wherein the at least one sublayer is a soft polyurethane layer.

5. The material for a shoe upper of claim 1, wherein one sublayer of the at least three polyurethane sublayers has a lower melting point and is arranged closer to the textile reinforcing layer than the other sublayers of the at least three polyurethane sublayers.

6. The material for a shoe upper of claim 5, wherein a melting point of the one sublayer is between about 100° C. and about 150° C., and a melting point of the other sublayers of the at least three polyurethane sublayers is between about 150° C. and about 200° C.

7. A shoe upper comprising at least one material of claim 1.

8. A shoe upper comprising at least two materials of claim 1, wherein the at least two materials are arranged in different zones of the shoe upper.

9. Material for a shoe upper, in particular for soccer shoes, comprising:
   (a) an inner polyurethane layer;
   (b) an outer polyurethane layer; and
   (c) a textile reinforcing layer comprising apertures, which is arranged between the inner polyurethane layer and the outer polyurethane layer,
   wherein the inner polyurethane layer and the outer polyurethane layer comprise thermoset polyurethane and are connected to each other through a plurality of the apertures of the textile reinforcing layer,
   wherein at least one of the inner polyurethane layer and the outer polyurethane layer comprises at least three polyurethane sublayers, and
   wherein one sublayer of the at least three polyurethane sublayers has a lower melting point and is arranged closer to the textile reinforcing layer than the other sublayers of the at least three polyurethane sublayers.

10. The material for a shoe upper of claim 9, wherein the textile reinforcing layer comprises a non-thermoplastic material.

11. The material for a shoe upper of claim 9, wherein at least one sublayer of the at least three polyurethane sublayers has a thickness of about 0.03-0.04 mm.

12. The material for a shoe upper of claim 11, wherein the at least one sublayer is a soft polyurethane layer.

13. The material for a shoe upper of claim 9, wherein a melting point of the one sublayer is between about 100° C. and about 150° C., and a melting point of the other sublayers of the at least three polyurethane sublayers is between about 150° C. and about 200° C.

14. A shoe upper comprising at least one material of claim 9.

15. A shoe upper comprising at least two materials of claim 9, wherein the at least two materials are arranged in different zones of the shoe upper.

16. Material for a shoe upper, in particular for soccer shoes, comprising:
   (a) an inner polyurethane layer;
   (b) an outer polyurethane layer; and
   (c) a textile reinforcing layer arranged between the inner polyurethane layer and the outer polyurethane layer,
   wherein the textile reinforcing layer comprises a plurality of apertures,
   wherein each aperture of the plurality of apertures comprises an area ranging from about 0.25 $mm^2$ to about 9 $mm^2$,
   wherein the inner polyurethane layer and the outer polyurethane layer comprise thermoset polyurethane and are connected to each other through a plurality of the apertures of the textile reinforcing layer, and wherein at least one of the inner polyurethane layer and the outer polyurethane layer comprises at least three polyurethane sublayers.

17. The material for a shoe upper of claim 16, wherein the textile reinforcing layer comprises a non-thermoplastic material.

18. The material for a shoe upper of claim 16, wherein at least one sublayer of the at least three polyurethane sublayers has a thickness of about 0.03-0.04 mm.

19. The material for a shoe upper of claim 18, wherein the at least one sublayer is a soft polyurethane layer.

20. The material for a shoe upper of claim 16, wherein one sublayer of the at least three polyurethane sublayers has a lower melting point and is arranged closer to the textile reinforcing layer than the other sublayers of the at least three polyurethane sublayers.

21. The material for a shoe upper of claim 20, wherein a melting point of the one sublayer is between about 100° C. and about 150° C., and a melting point of the other sublayers of the at least three polyurethane sublayers is between about 150° C. and about 200° C.

22. A shoe upper comprising at least two materials of claim 16, wherein the at least two materials are arranged in different zones of the shoe upper.

* * * * *